Nov. 3, 1931.   G. S. WEBB   1,830,075
WHEEL FOR VEHICLES
Filed May 14, 1929
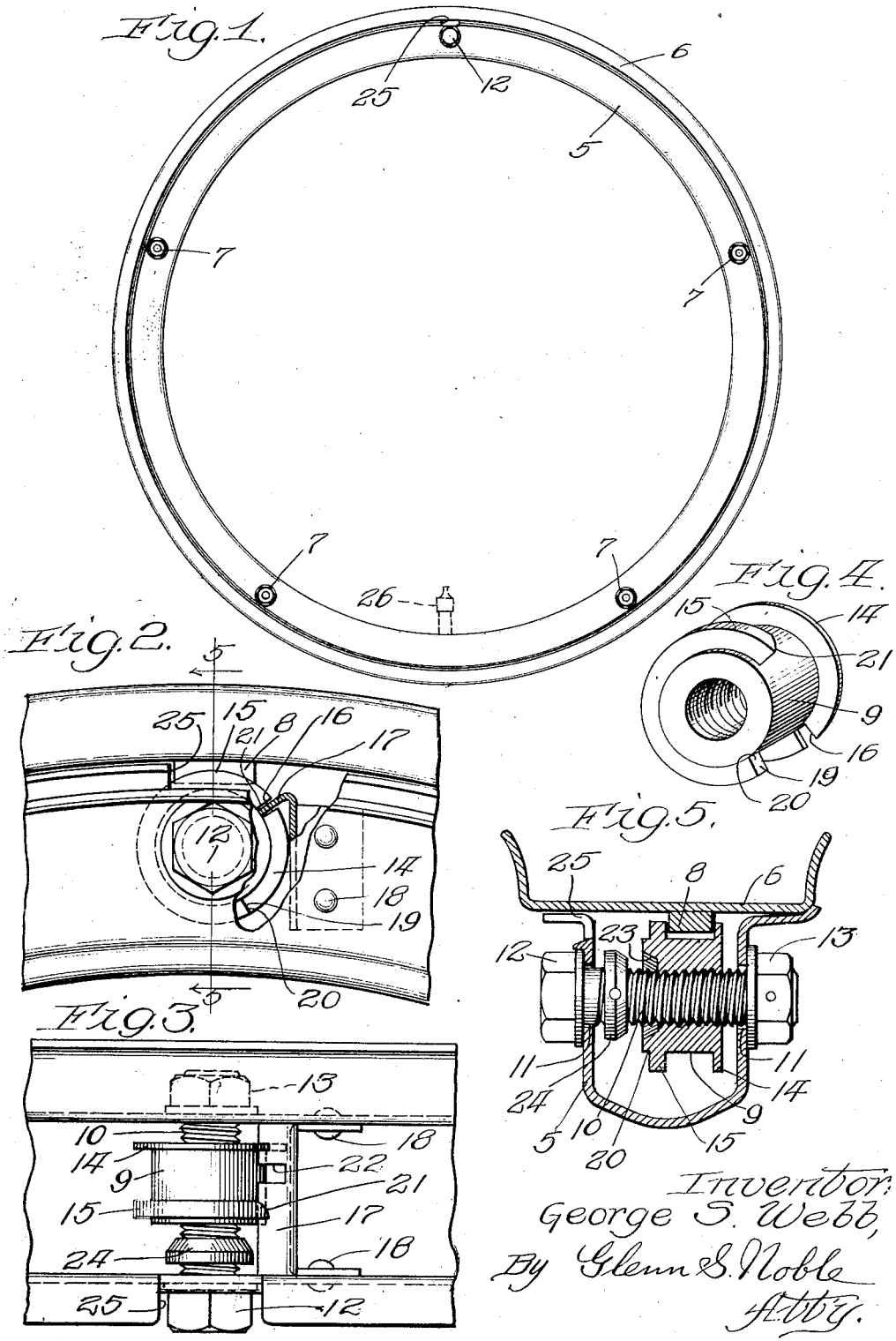

Patented Nov. 3, 1931

1,830,075

UNITED STATES PATENT OFFICE

GEORGE S. WEBB, OF AURORA, ILLINOIS

WHEEL FOR VEHICLES

Application filed May 14, 1929. Serial No. 362,942.

This invention relates to wheels having demountable rims and particularly to means for applying and removing the rim from the felloe or fixed rim member.

Heretofore, various types of demountable rims have been utilized, but most of such rims are difficult to apply or remove, particularly when they have been on the wheel for a considerable length of time and have become stuck or rusted. In accordance with the present invention I provide means coacting with the fixed and movable rim members for forcing the demountable rim into and out of position so that it may be applied and removed with little force or difficulty.

The objects of this invention are to provide an improved wheel having means for forcing a detachable rim into and out of position; to provide a wheel having an operative member adapted to coact with the rim for forcing the rim on and off; and to provide a wheel having such improved features and advantages as will appear more fully from the following description.

In the accompanying drawings illustrating this invention

Figure 1 is a front view;

Figure 2 is an enlarged detail view of the rim actuating device;

Figure 3 is a plan view of the same;

Figure 4 is perspective view of the adjusting nut or member; and

Figure 5 is a sectional view taken on the line 5—5 of Figure 2.

As shown in these drawings, the fixed rim 5 of the wheel, which for convenience will be designated as the felloe, may be of any ordinary or preferred form of construction but is preferably channel-shaped in order to permit the application of the rim-actuating device. The demountable rim 6 engages with the felloe 5 in the usual manner and may be held by suitable clamps or bolts 7.

The rim 6 has an inwardly extending lug or projection 8 which is engaged by a reciprocable nut or actuating member 9 for forcing the rim into and out of position. The nut 9 is carried on a bolt 10 which is preferably provided with left-hand threads which engage with corresponding threads in the nut. The bolt 10 is freely rotatable in holes or bearings 11 in the sides of the felloe 5 and is held against longitudinal movement in one direction by its head 12 and in the other direction by a nut 13 on the inner end thereof.

The nut or rim adjusting member 9 has a flange 14 on the inner end which engages with one side of the lug 8 and has a flange 15 at the other end which engages with the opposite side or face of the lug. The flange 14 has a slot 16 which fits over or engages with a guide strip or plate 17 which plate extends across the felloe and is secured to the sides by means of rivets 18. The flange 15 is cut away for a considerable distance as indicated at 19, thereby providing shoulders or abutments 20 and 21 at the ends thereof which are also adapted to engage at times with the guide plate 17. This plate has a notch or recess 22 in its forward edge, the purpose of which will be presently explained. The end of the nut 9 has a tapered recess 23 which is adapted to receive a tapered clutch member or ring 24 which is secured to the screw 10 adjacent to the nut. In this particular form of the device, the outer edge or side of the felloe is provided with a notch or is cut away, as shown at 25, to permit the free passage of the lug 8 therethrough.

The rim-pulling member or device is preferably located on the side of the wheel opposite from the valve stem 26, as shown in Figure 1, for convenience in putting the rim on and taking it off.

When a rim is to be put on, the bolt 10 is turned until the nut 9 is in its forward or outermost position at which time the flange 14 has entered the slot 22 and the clutch 24 has engaged with the tapered recess in the end of the nut. When the flange 14 enters the slot 22 it permits the nut to turn with the bolt to the left or anti-clockwise until the nut or shoulder 20 of the flange 15 strikes the plate or guide 17. At this time the cut away portion 19 will be in the uppermost position so that the lug 8 may pass freely beyond the flange 15 and will engage with the flange 14 when the rim is pushed over the upper portion of the felloe. It is understood that at this time the lower portion of the rim has been placed in position with the valve stem extending through the hole provided for the same so that the lower portion of the rim is practically in engaging position with the felloe.

The operator then turns the screw 10 to the right or clockwise which causes the nut to rotate therewith, due to the clutch 24, until the nut or shoulder 21 of the flange 15 strikes the guide plate 17. This prevents the further rotation of the nut 9 and brings the slot 16 into alignment with the edge of the notch 22 so that it is in position to pass over the plate 17. The further rotation of the bolt then causes the nut to move longitudinally along the screw with the flange 15 pressing against the lug 8 which causes the rim to be forced onto the felloe to proper engaging or running position, for instance, as shown in Figure 5. When the rim is fully engaged, the wrench is withdrawn from the bolt 10 and the parts remain in such position whereby the device serves to lock the rim in place, and the remaining fastening members 7 may then be tightened in the usual manner.

When the rim is to be removed, the operator turns the bolt 10 to the left or in an anti-clockwise direction which first causes the nut 9 to move longitudinally thereof due to the guide plate 17 engaging with the slot 16 in the flange 14. This longitudinal movement causes the flange 14 to pull against the lug 8 and thereby draw the rim outwardly and free it from the felloe. As the turning movement of the bolt is continued the nut finally reaches a position where the flange 14 passes into the notch 22 and permits the nut to rotate with the bolt as above described so that the opening 19 of the flange 15 comes in position to permit the outward movement of the lug.

It may be noted that when the flange 14 enters the notch 22, the friction between the nut and the bolt would ordinarily be sufficient to cause the rotation of the nut with the bolt, but I prefer to provide the clutch arrangement which insures the reverse movement of the nut to bring the slot 16 into engagement with the plate 17.

From this description it will be seen that I provide a "rim puller" or actuating member whereby the rim may be forced on or off with comparatively little effort on the part of the operator due to the powerful leverage obtained by means of the screw which, of course, may be varied by giving any desired pitch thereto. It will also be noted that any suitable interconnection or engaging arrangement may be made between the nut and the rim to provide for the necessary movement and other changes may be made in the details of construction and the arrangement of the various elements in order to adapt the device to different wheels or rims. Therefore I do not wish to be limited to the exact arrangement herein shown and described.

I claim:

1. The combination with a felloe of a bolt rotatably mounted therein, a rim actuating member having threaded engagement with the bolt and having inner and outer flanges thereon, said inner flange having a slot therein and the outer flange being cut away for a portion of its circumference, a guide plate secured to the felloe and adapted to engage with the slot in the inner flange, said guide plate having a notch for receiving said inner flange to permit the turning of said member with the bolt when said inner flange is in juxtaposition with said notch, a rim for engagement with the felloe, and a lug on said rim adapted to be engaged by the flanges on said member, the arrangement being such that when the bolt is turned in one direction the outer flange will engage with the lug to press the rim inwardly and one end of the flange will engage with the guide to prevent the further rotation of said member so that said member will move longitudinally with the bolt to force the rim in position and the inner flange being adapted to engage with the lug to draw the rim off when the bolt is turned in the opposite direction.

2. A demountable rim device comprising a channel-shaped felloe, a bolt rotatably mounted in said felloe, a clutch member secured to the bolt, a nut on the bolt having a recess for engagement with the clutch member to lock the nut to the bolt when the nut has reached the end of its travel in one direction on the bolt, said nut having an inner flange with a slot therein, and an outer flange extending partly around the same, a guide plate secured to the felloe which engages with the slot in the inner flange and is also adapted to be engaged by the ends of the outer flange, said guide plate having a notch therein with which the inner flange is adapted to register when the nut is in its outermost position, a rim fitting over said felloe, and a lug on the rim adapted to be engaged by the flanges on the nut whereby the rim may be forced inwardly or drawn outwardly, substantially as described.

3. The combination of a substantially U-shaped felloe having outwardly projecting flanges, a tire rim for engagement with said flanges, a lug on the inner periphery of said rim which is approximately at the center of the felloe when the rim is in position, one flange and the adjacent portion of the felloe being cut away to permit the passage of the lug, a screw extending through the felloe with with its head on one side thereof and having a nut on the opposite side, a nut engaging with the screw and having a conical recess at one end, a conical stop secured to the screw and adapted to engage with said recess when the nut is at one end of its travel, an annular projection extending part way around the nut at one end thereof, a second projection around the nut at the opposite end thereof having a slot therein and a transverse guide secured to the felloe adjacent to the nut and engaging with the slot in the last named projection, a recess in said guide adapted to register with the last named projection when the nut is at one end of its travel to permit rotation of the nut, said guide also being adapted to be engaged by the ends of the first named projection to fix the peripheral positioning of the nut with respect to the felloe, the arrangement being such that when the nut is in position for placing the rim on the felloe the space between the ends of the first named projection will register with the cut away portion of the felloe and permit the lug to pass beyond the first named projection, said lug fitting closely between the projections on the nut whereby it will be moved by the nut when the screw is turned to force the rim onto or off from the felloe.

4. In a device of the character set forth, the combination of a U-shaped felloe, a bolt rotatably mounted in the felloe, means for holding the bolt against longitudinal movement, a nut engaging with the bolt and positioned between the sides of the felloe, a guide secured to the felloe and coacting with the nut to prevent rotation of the nut to cause it to move longitudinally of the bolt when the bolt is turned a predetermined number of times and for permitting its rotation after the bolt has been turned a predetermined number of times, a rim adapted to fit over the felloe, a lug on said rim and projections on the nut for engagement with the lug whereby the rim will be moved laterally when the nut moves along the bolt in order to press the rim onto the felloe or to free the same from the felloe.

GEORGE S. WEBB.